(12) United States Patent
Scheffler

(10) Patent No.: US 8,464,664 B1
(45) Date of Patent: Jun. 18, 2013

(54) PET TOY CONVERTIBLE BETWEEN A COMPACT CONFIGURATION AND AN EXPANDED CONFIGURATION

(76) Inventor: Keith Scheffler, Springdale, AR (US)

( * ) Notice: Subject to any disclaimer, the term of this patent is extended or adjusted under 35 U.S.C. 154(b) by 63 days.

(21) Appl. No.: 13/198,698

(22) Filed: Aug. 4, 2011

(51) Int. Cl.
*A01K 29/00* (2006.01)

(52) U.S. Cl.
USPC .......................................................... 119/707

(58) Field of Classification Search
USPC .................. 119/707, 702, 708, 709, 710, 711
See application file for complete search history.

(56) References Cited

U.S. PATENT DOCUMENTS

| | | | | |
|---|---|---|---|---|
| 3,442,045 | A * | 5/1969 | Green | 446/297 |
| 4,752,267 | A * | 6/1988 | Layman | 446/46 |
| D323,000 | S * | 1/1992 | Atwell | D21/444 |
| 5,310,380 | A * | 5/1994 | Levy et al. | 446/489 |
| 5,685,076 | A * | 11/1997 | Curley et al. | 29/897.3 |
| 6,520,825 | B1 * | 2/2003 | Herr | 446/71 |
| 6,805,077 | B2 * | 10/2004 | Goldman | 119/707 |
| 7,600,488 | B2 * | 10/2009 | Mann | 119/710 |
| 7,662,012 | B2 * | 2/2010 | Wright | 446/34 |
| 7,914,405 | B1 * | 3/2011 | Scheffler et al. | 473/572 |
| 8,256,383 | B2 * | 9/2012 | Madsen | 119/705 |

* cited by examiner

*Primary Examiner* — Yvonne Abbott
(74) *Attorney, Agent, or Firm* — LaMorte & Associates, P.C.

(57) ABSTRACT

A toy device that is selectively configurable between a compact configuration and an extended configuration. The toy device has two end caps. The two end caps are mirrored in shape and size. The two end caps are interconnected by a plurality of tubular segments. The end caps and plurality of tubular segments are molded as a single unit from a common elastomeric material. The plurality of tubular segments are selectively collapsible into the two end caps. When collapsed, the end caps touch and the toy device exists in its compact configuration. When the end caps are pulled apart, the tubular segments unfold and the toy device exists in its extended configuration.

14 Claims, 5 Drawing Sheets

PET TOY CONVERTIBLE BETWEEN A COMPACT CONFIGURATION AND AN EXPANDED CONFIGURATION

BACKGROUND OF THE INVENTION

1. Field of the Invention

In general, the present invention relates to plastic chew toys for larger pets. More particularly, the present invention relates to pet toys that can be configured into different shapes by physical manipulation.

2. Prior Art Description

In the prior art, there are a great many toys and training devices that have been manufactured for dogs. Dogs are instinctive hunters of small, fast-moving prey. Accordingly, dogs will instinctively run after small objects that are thrown across their line of sight. This is why most dogs can play the game of fetch.

Dogs, however, will not play any game forever. Dogs tire and become bored of activities, even play. Some dogs will continue to fetch an object until they become exhausted. Others will bore of the activity after only one or two fetches.

It has been long established that a dog will play longer if it is rewarded for the play. For example, if the item being used to play fetch contains an edible treat, the dogs will rarely tire of the game. Likewise, if the item used to play fetch is changed periodically during the game, the change in the object retains the dog's interest longer and the dog will play the game longer.

In the prior art, there are countless objects that can be used to play fetch with a dog. Sticks, balls, Frisbees®, knotted cloth are only a few examples. Treats, such as dog biscuits, can be hidden in many such objects. However, the treat is often either too easy for the dog to retrieve or too hard. If the treat is too easy to retrieve, the dog may fetch the treat and leave the fetched item behind. If the treat is too difficult to retrieve, the dog may lose interest.

A need therefore exists for a pet toy that is capable of holding a treat in a manner that is challenging to a dog, yet not frustrating. A need also exists for a pet toy that is capable of changing its configuration without adversely affecting its ability to retain a treat. The need also exists for a pet toy, whose configuration is appealing to a dog, so as to be interesting to a dog even when the edible material is not present. These needs are met by the present invention as described and claimed below.

SUMMARY OF THE INVENTION

The present invention is a toy device that is selectively configurable between a compact configuration and an extended configuration. The toy device has two end caps. The two end caps are mirrored in shape and size. The two end caps are interconnected by a plurality of tubular segments. The end caps and plurality of tubular segments are molded as a single unit from a common elastomeric material. The plurality of tubular segments are selectively collapsible into the two end caps. When collapsed, the end caps touch and the toy device exists in its compact configuration. When the end caps are pulled apart, the tubular segments unfold and the toy device exists in its extended configuration.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention pet toy device can be embodied in many ways, the embodiment illustrated shows the pet toy being convertible between a bone configuration and a ball configuration. This embodiment is selected in order to set forth the best mode contemplated for the invention. The illustrated embodiment, however, is merely exemplary and should not be considered a limitation when interpreting the scope of the appended claims.

Figure 1:
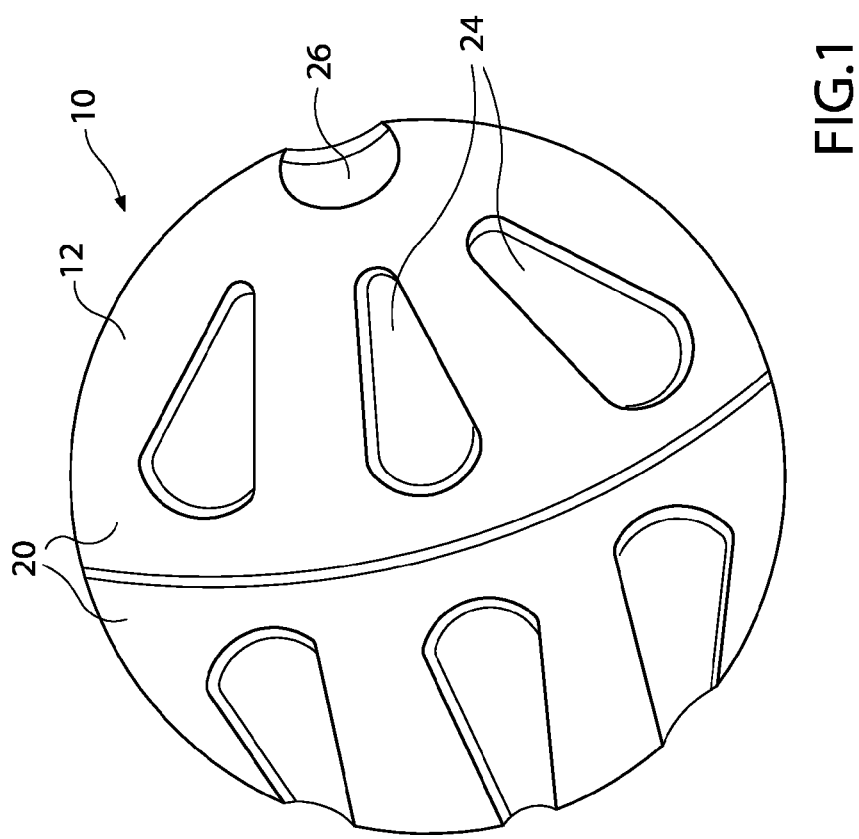
FIG. 1 is a side view of an exemplary embodiment of a pet toy device in its compact configuration.
Figure 2:
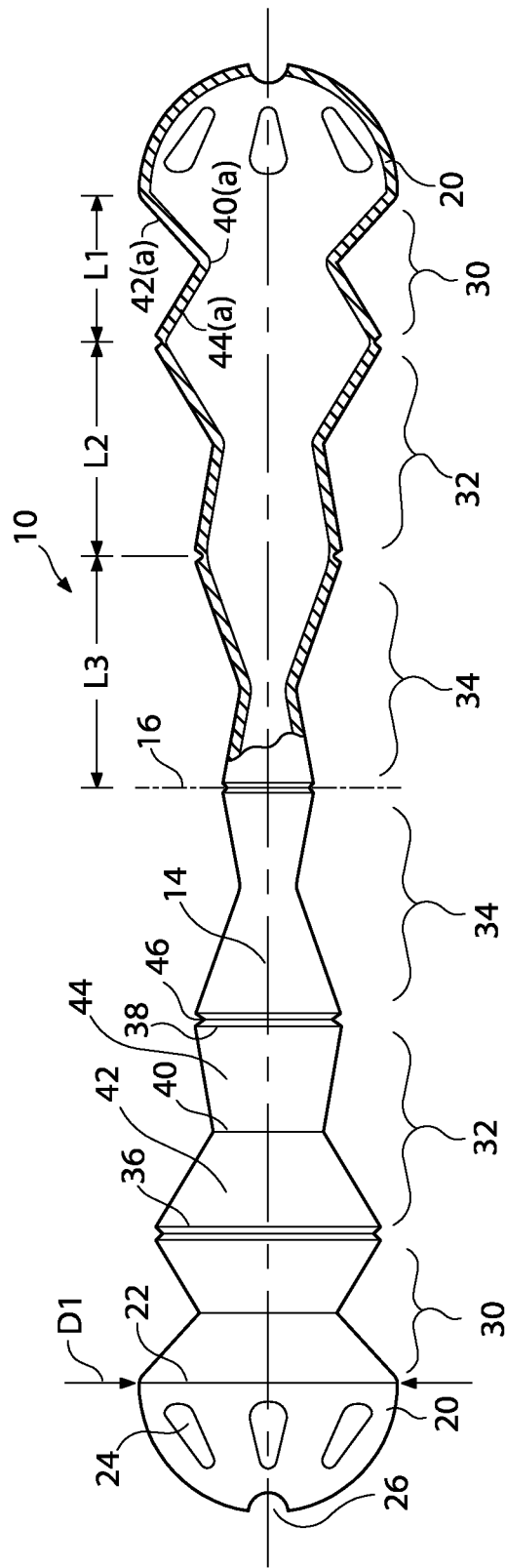
FIG. 2 is a partially cross-sectioned side view of the embodiment of FIG. 1 shown in its expanded configuration.

Referring to FIG. 1 and FIG. 2, a pet toy device 10 is shown. The pet toy device 10 is selectively configurable between a compact configuration and an expanded configuration. The compact configuration is shown in FIG. 1 and the expanded configuration is shown in FIG. 2. When in the compact configuration, the exemplary embodiment is ball shaped. When in the expanded configuration, the pet toy device 10 is shaped like a bone or barbell.

The pet toy device 10 is molded as a single piece from an elastomeric material. The body 12 of the pet toy device 10 has two hemispherical end caps 20. The end caps 20 are aligned on a common imaginary axis 14. Each of the hemispherical end caps 20 curves to a maximum diameter D1 at its brim 22. A plurality of eccentric openings 24 are formed in the hemispherical end caps 20. The eccentric openings 24 are symmetrically disposed around central openings 26, wherein the central openings 26 are aligned with the imaginary axis 14.

A plurality of segments 30, 32, 34 join the two hemispherical end caps 20 together. The segments 30, 32, 34 are symmetrically disposed around the imaginary axis 14. Furthermore, the segments 30, 32, 34 are bisected by an imaginary midline 16. That is, the number of segments 30, 32, 34 on either side of the imaginary midline 16 are equal in number.

In the shown embodiment, the segments include a set of large segments 30, a set of medium segments 32 and a set of small segments 34. Each of the segments 30, 32, 34 has a cap end 36, an opposite center end 38 and a central node 40. The cap end 36 of each segment 30, 32, 34 is the end facing the closest hemispherical end cap 20. The center end 38 is the end of each segment 30, 32, 34 is the end facing the midline 16. The diameter of the cap end 36 of each segment 30, 32, 34 is greater than the diameter of the center end 38 of that same segment.

In each segment 30, 32, 34, a node 40 is formed generally halfway between the cap end 36 and the center end 38. The node 40 has a diameter that is less than the diameter of the cap end 36 and less than the diameter of the center end 38. Accordingly, each segment 30, 32, 34 tapers toward the node 40. This produces two frustum shaped sections 42, 44 that are in opposing orientations. The first frustum shaped section 42 converges from the cap end 36 toward the node 40. The second frustum shaped section 44 expands from the node 40 to the center end 38.

The length of the segments 30, 32, 34 vary as a function of distance to an end cap 20. The closer a segment 30, 32, 34 is to an end cap 20, the shorter that segment is. As is shown in the exemplary embodiment, the large segments 30 have the shortest length L1. The medium segments 32 have a longer length L2. The small segments 34 have the longest length L3.

In the shown embodiment, there are three segments 30, 32, 34 on either side of the midline 16. Accordingly, the pet toy device 10 has a total of six segments that are interposed between two end caps 20. The first, second and third segments are the mirror images of the fourth, fifth and sixth segments. As such, the segments 30, 32, 34 are identified in mirrored sets.

Folding grooves 46 are formed at the interfaces between adjacent segments 30, 32, 34 and at the interfaces between the end caps 20 and segments 30. Each folding groove 46 creates a thinning in the material of the body 12, thereby making the body 12 easier to bend and fold at these points.

Figure 3:
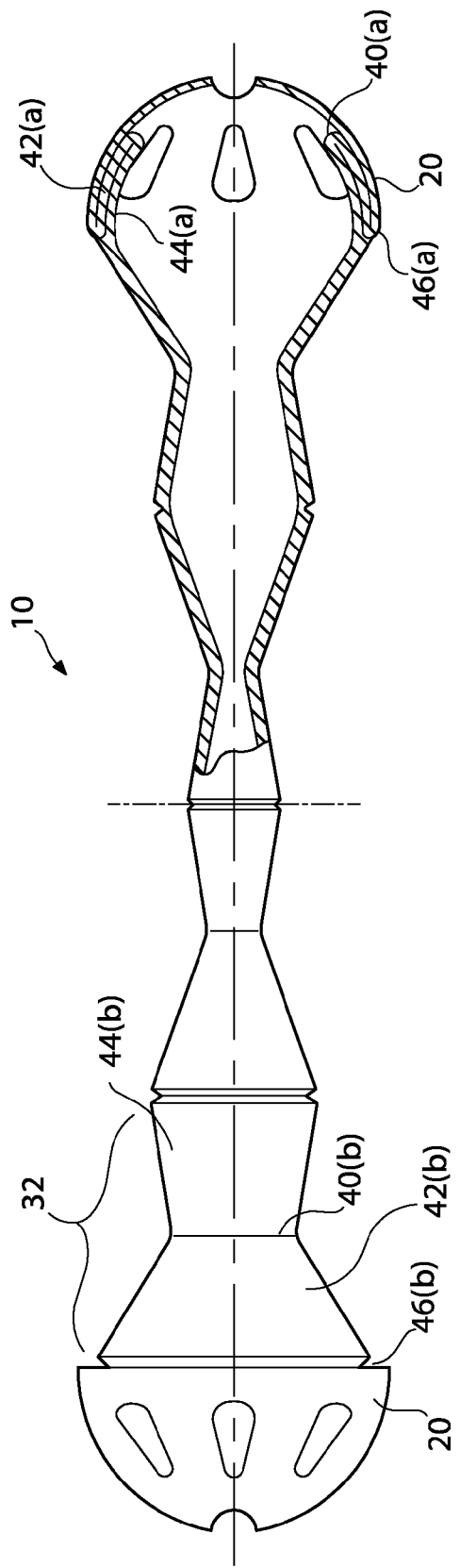
FIG. 3 is a partially cross-sectioned view of the embodiment of FIG. 1, shown with its large segment folded.

Referring to FIG. 3 in conjunction with FIG. 2, the operation of the pet toy device 10 can begin to be described. Assuming that the pet toy device 10 is in its fully expanded configuration, such as is shown in FIG. 2, then the pet toy device 10 can be compacted. To begin the compaction sequence, the two end caps 20 are pressed toward each other. With a small degree of manual manipulation, the large segments 30 can be caused to fold. When the large segments 30 fold, the large segments 30 bend and fold both at the first folding groove 46(a) and at the central node 40(a). This causes the first frustum shaped area 42(a) to reverse direction and fold into the end cap 20. Likewise, the second frustum shaped section 44(a) folds into the first section 42(a). The entire large segment 30 is therefore folded within the interior of the end cap 20.

Figure 4:
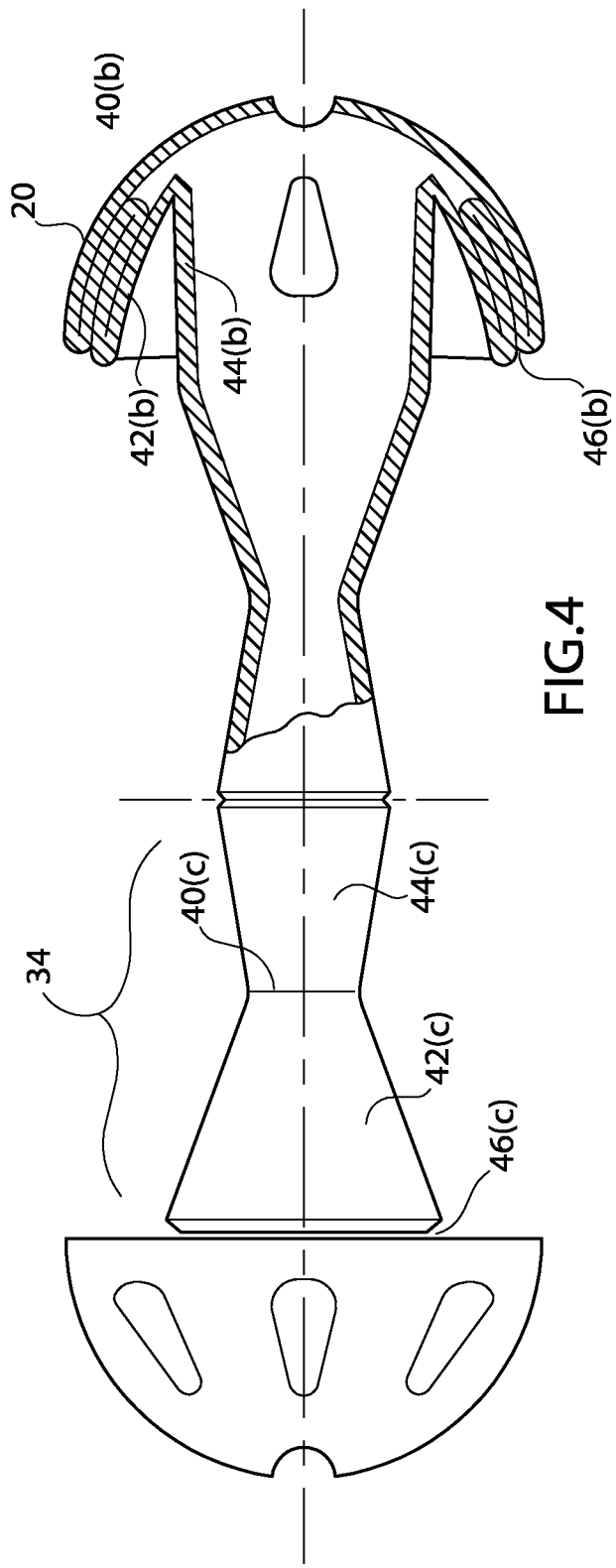
FIG. 4 is a partially cross-sectioned view of the embodiment of FIG. 1, shown with its large and medium segments folded.

To continue the compaction sequence, the two end caps 20 are again pressed toward each other. Referring to FIG. 4 in conjunction with FIG. 3 and FIG. 2, it can be seen that the medium segments 32 are caused to fold. When the medium segments 32 fold, the medium segments 32 bend and fold both at the folding groove 46(b) and at the central node 40(b). The first frustum shaped section 42(b) reverses direction and folds into the end cap 20. Likewise, the second frustum shaped section 44(b) folds into the first section. The entire medium segment 32 is therefore contained within the interior of the end cap 20. The medium segment 32 is longer than the large segment 30. Accordingly, when it folds into the end cap 20, the medium segment 32 extends further into the end cap 20 than does the folded first segment 30.

Figure 5:
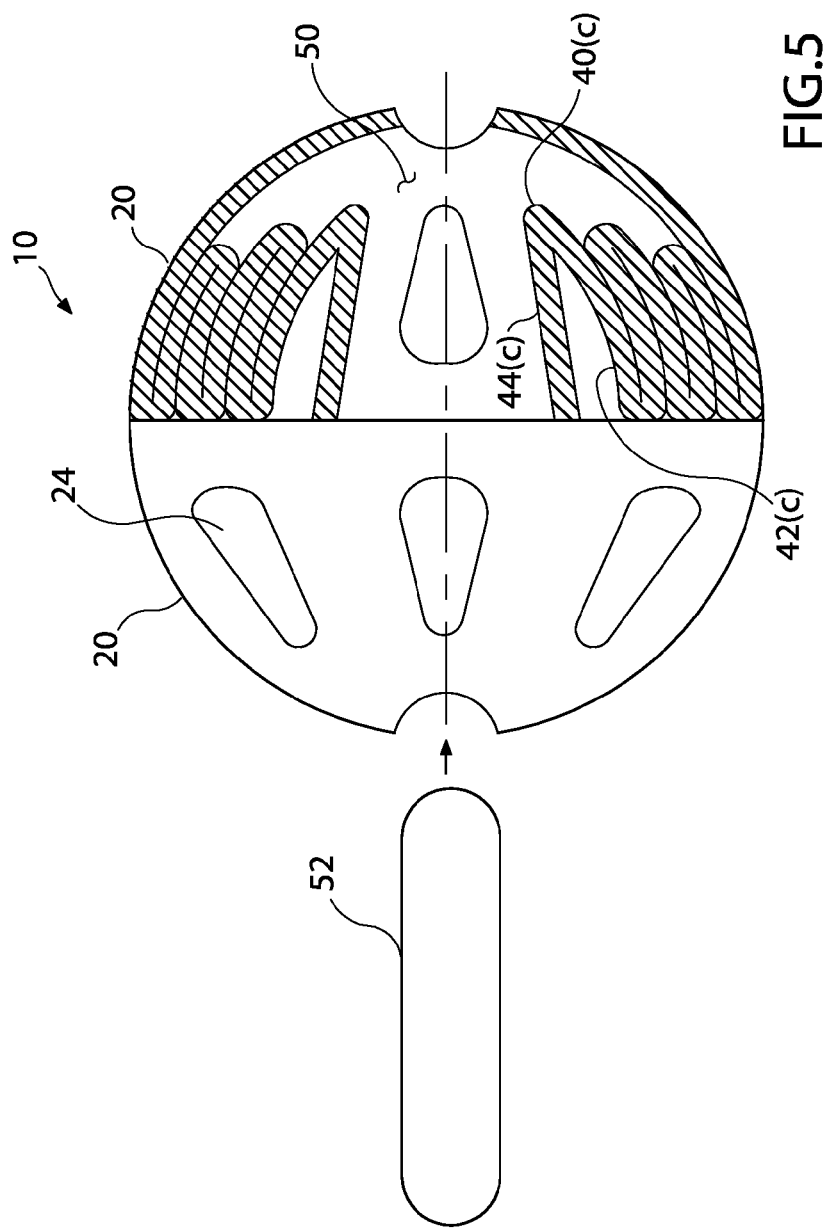
FIG. 5 is a partially cross-sectioned view of the embodiment of FIG. 1, shown with its large, medium, and small segments folded.

To finish the compaction sequence, the two end caps 20 are again pressed toward each other. Referring to FIG. 5 in conjunction with FIG. 4 and FIG. 2, it can be seen that the small segments 34 are caused to fold. When the small segments 34 fold, the small segments 34 bend and fold both at the folding groove 46(c) and at the central node 40(c). The first frustum shaped section 42(c) reverses direction and folds into the end cap 20. Likewise, the second frustum shaped section 44(c) folds into the first section 42(c). The entire small segment 34 is therefore contained within the interior of the end cap 20. The small segment 34 is longer than the medium segment 32. Accordingly, when it folds into the end cap 20, the small segment 34 extends further into the end cap 20 than does either the folded large segment 30 or the folded medium segment 32.

With all the segments 30, 32, 34 contained within the hemispherical end caps 20, the two end caps 20 abut. This creates a round ball shape and the pet toy device 10 is in its fully compact configuration.

As is illustrated in FIG. 5, even when the pet toy ball device 10 is in its fully compact configuration, an unobstructed conduit 50 extends between the central openings 26 of the two hemispherical end caps 20. This conduit 50 remains open and unobstructed when the pet toy is in its compacted configuration, in its expanded configuration and open at all stages in between.

An edible treat 52 may be provided that is sized to fit within the central conduit 50. Once the treat is inserted into the central conduit 50 and the pet toy device 10 is expanded to any degree, the treat 52 becomes misaligned with the central conduits 50 and cannot be easily removed. A dog chewing on the pet toy device 10 will be able to taste segments of the treat that beak away and fall through the eccentric openings 24 in the end caps 20.

In the illustrated embodiment, there are three sets of segments 30, 32, 34 between the midline and each hemispherical end cap 20. It will be understood that the use of three sets of segments 30, 32, 34 is merely exemplary and that any plurality of segment sets can be used. The number of segment sets is limited only by the amount of room available in each hemispherical end cap 20. Accordingly, by using end caps with larger diameters, pet toys with larger numbers of segments can readily be produced.

In the exemplary embodiment, the pet toy device 10 produces a round ball when in its compact configuration. It should be understood that the shape of the end caps 20 can be altered to produce an oblong football shape, a cube shape and many other shapes other than round. It will therefore be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A toy device, comprising:
   two end caps; and
   a plurality of segments that interconnect said end caps, said end caps and said plurality of segments being molded as a single unit from elastomeric material, wherein said toy device is selectively configurable between a compact configuration and an extended configuration, wherein said segments fold into said end caps when in said compact configuration and wherein said segments are unfolded when in said extended configuration;
   wherein, when in said extended configuration, each of said segments includes a first end, an opposite second end and a center between said first end and said second end, wherein said first end is larger than said second end, and said second end is larger than said center.

2. The device according to claim 1, wherein said end caps are hemispherical.

3. The device according to claim 1, wherein said toy device is symmetrically disposed about opposite sides of an imaginary midline and said plurality of segments include even numbers of segments on either side of said imaginary midline.

4. The device according to claim 3, wherein each of said plurality of segments on either side of said imaginary midline are of different sizes.

5. The device according to claim 1, further including a folding groove formed in said pet toy device between each of said plurality of segments at each said center.

6. The device according to claim 1, wherein a plurality of holes is formed in said end caps.

7. The device according to claim 6, wherein an open conduit extends through said plurality of segments and said end caps between at least two of said plurality of holes.

8. A toy device, comprising:
two end caps, wherein each end cap is hemispherical in shape; and
a plurality of interconnected tubular segments that extend between said end caps and are symmetrically disposed about opposite sides of an imaginary midline, said tubular segments having an even numbers of segments on either side of said imaginary midline, wherein each of said tubular segments on either side of said imaginary midline are of different sizes, wherein said end caps and said plurality of segments are made from elastomeric material, and wherein said tubular segments are selectively collapsible into said end caps.

9. The device according to claim 8, wherein said end caps and said tubular segments are molded as a single unit.

10. The device according to claim 8, wherein said toy device is selectively configurable between a compact configuration and an extended configuration, wherein said segments fold into said end caps when in said compact configuration and wherein said segments are unfolded when in said extended configuration.

11. The device according to claim 8, wherein, when unfolded, each of said tubular segments includes a first end, an opposite second end and a center between said first end and said second end, wherein said first end is larger than said second end, and wherein said second end is larger than said center.

12. The device according to claim 8, further including a folding groove formed in said toy device between each of said tubular segments.

13. The device according to claim 8, wherein a plurality of holes is formed in said end caps.

14. The device according to claim 13, wherein an open conduit extends through said tubular segments and said end caps between at least two of said plurality of holes.

* * * * *